United States Patent
Hafner

(10) Patent No.: US 9,200,527 B2
(45) Date of Patent: Dec. 1, 2015

(54) SYSTEMS, METHODS, AND APPARATUS FOR A TURBINE INTERSTAGE RIM SEAL

(75) Inventor: Matthew Troy Hafner, Greenville, SC (US)

(73) Assignee: General Electric Company, Schenectady, NY (US)

( * ) Notice: Subject to any disclaimer, the term of this patent is extended or adjusted under 35 U.S.C. 154(b) by 1048 days.

(21) Appl. No.: 12/984,244

(22) Filed: Jan. 4, 2011

(65) Prior Publication Data

US 2012/0171022 A1 Jul. 5, 2012

(51) Int. Cl.
*F01D 11/00* (2006.01)
*F01D 5/08* (2006.01)
*F01D 11/02* (2006.01)
*F02C 7/28* (2006.01)

(52) U.S. Cl.
CPC ............. *F01D 11/001* (2013.01); *F01D 5/082* (2013.01); *F01D 11/025* (2013.01); *F02C 7/28* (2013.01); *F05D 2240/11* (2013.01); *F05D 2240/55* (2013.01)

(58) Field of Classification Search
CPC ..... F01D 11/00; F01D 11/006; F01D 11/008; F01D 11/005; F01D 11/02; F01D 11/025; F16J 15/16; F16J 15/32; F16J 15/3204; F16J 15/322; F16J 15/3456
USPC ........... 415/174.2, 174.3, 170.1, 173.7, 174.5
See application file for complete search history.

(56) References Cited

U.S. PATENT DOCUMENTS

| | | | |
|---|---|---|---|
| 3,547,451 A * | 12/1970 | Milot et al. | 277/433 |
| 3,788,143 A | 1/1974 | Gabriel | |
| 3,895,815 A * | 7/1975 | Panigati | 277/448 |
| 4,526,508 A | 7/1985 | Antonellis et al. | |
| 4,580,946 A * | 4/1986 | Bobo | 416/193 A |
| 4,664,559 A | 5/1987 | Berrang | |
| 4,743,164 A | 5/1988 | Kalogeros | |
| 4,884,950 A | 12/1989 | Brodell et al. | |
| 5,464,326 A * | 11/1995 | Knott | 416/193 A |
| 6,161,836 A * | 12/2000 | Zhou | 277/355 |
| 6,398,488 B1 | 6/2002 | Solda et al. | |
| 6,464,453 B2 | 10/2002 | Toborg et al. | |
| 7,059,829 B2 * | 6/2006 | Garner | 415/173.7 |
| 7,549,841 B1 * | 6/2009 | Marussich | 415/173.3 |
| 8,262,348 B2 * | 9/2012 | Diakunchak | 415/173.3 |
| 8,388,310 B1 * | 3/2013 | Diakunchak | 415/173.7 |

\* cited by examiner

*Primary Examiner* — Edward Look
*Assistant Examiner* — Christopher R Legendre
(74) *Attorney, Agent, or Firm* — Sutherland Asbill & Brennan LLP

(57) ABSTRACT

Certain embodiments of the invention may include systems, methods, and apparatus for providing a turbine interstage rim seal. According to an example embodiment of the invention, a method is provided for sealing a turbine rotor-bucket interface. The method can include linking a first portion of one or more rim seal segments with one or more flow path seal segments. The method includes rotating the one or more rim seal segments, upon application of centrifugal force, to displace a second portion of the one or more rim seal segments; and sealing at least a portion of a gap between a rotor and a bucket associated with a turbine with at least one or more rotated rim seal segments.

17 Claims, 4 Drawing Sheets

SYSTEMS, METHODS, AND APPARATUS FOR A TURBINE INTERSTAGE RIM SEAL

FIELD OF THE INVENTION

This invention generally relates to gas turbine engines, and more particularly, to turbine interstage rim seals.

BACKGROUND OF THE INVENTION

Gas turbines utilize components known as buckets (or blades) for generating rotational energy from hot compressed gases. The turbine buckets are mounted to the perimeter of a turbine rotor wheel, which can rotate about the centerline axis of the engine. As hot combustion gases exit the combustor and flow across the turbine buckets, the turbine rotor wheel rotates. In doing so, energy from the hot combustion gases is converted to rotational energy, which may be utilized to drive electrical generators or may provide direct mechanical work, for example.

Materials used to construct the turbine rotor wheel can differ from other turbine components, and in many designs, the turbine rotor wheel is not as resistant to heat as the buckets that are directly exposed to the hot combustion gases. As a result, the high temperatures of the hot combustion gases can exceed the metallurgical limitations of the turbine rotor wheel, causing thermal stresses, oxidation, and structural cracking To prevent the turbine rotor wheel from overheating, cooling air can be extracted from the compressor to cool the spaces surrounding and within the turbine rotor assembly, including those in thermal contact with the turbine rotor wheel. Extracting air in this conventional way may divert air from the combustor and may hamper the efficiency of the engine cycle.

BRIEF SUMMARY OF THE INVENTION

Some or all of the above needs may be addressed by certain embodiments of the invention. Certain embodiments of the invention may include systems, methods, and apparatus for a turbine interstage rim seal.

According to an example embodiment of the invention, a method is provided for sealing a turbine rotor-bucket interface. The method includes linking a first portion of one or more rim seal segments with one or more flow path seal segments, and upon application of centrifugal force, rotating the one or more rim seal segments to displace a second portion of the one or more rim seal segments. The method also includes sealing at least a portion of a gap between a rotor and a bucket associated with a turbine with at least one or more rotated rim seal segments.

According to another example embodiment, a system is provided for sealing a turbine rotor-bucket interface. The system includes a rotor, at least one bucket, one or more flow path seal segments, and one or more rim seal segments having a first portion linked with the one or more flow path seal segments. The one or more rim seal segments are configured to rotate upon application of centrifugal force to displace a second portion of the one or more rim seal segments and seal at least a portion of a gap between the one or more flow path seal segments, the rotor, and the at least one bucket.

According to another example embodiment, an apparatus is provided for sealing a turbine rotor-bucket interface. The apparatus includes one or more rim seal segments having a first portion linked with one or more flow path seal segments. The one or more rim seal segments are configured to rotate upon application of centrifugal force to displace a second portion of the one or more rim seal segments and seal at least a portion of a gap between the one or more flow path seal segments, a rotor, and at least one bucket.

Other embodiments and aspects of the invention are described in detail herein and are considered a part of the claimed invention. Other embodiments and aspects can be understood with reference to the following detailed description, accompanying drawings, and claims.

BRIEF DESCRIPTION OF THE FIGURES

Reference will now be made to the accompanying tables and drawings, which are not necessarily drawn to scale, and wherein.

DETAILED DESCRIPTION OF THE INVENTION

Embodiments of the invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Certain embodiments of the invention may enable sealing portions of a turbine interstage rim to isolate components that are in the hot gas path from components that may require cooling air. According to certain example embodiments of the invention, one or more rim seals (segments or strips) are provided for use with an interstage rim. According to certain example embodiments of the invention, the seals may be designed to load against the sealing surface due to centrifugal force that is produced by rotation of the turbine rotor assembly. Example embodiments of the seals can be a solid metal. Example embodiments of the seals can be made from high temperature resistant material that may be the same or similar to materials used in making hot gas path components, such as the buckets. Example embodiments of the seals can include an assembly having compliant wire rope. Other example embodiments of the invention may include an assembly having a bristle structure or a compliant foil structure.

According to example embodiments of the invention, the seals can be relatively straight or curved to match or otherwise conform with the radius of the interstage rim seal, depending on the seal construction and desired level of sealing needed. In example embodiments, the seals may be axially retained in a retention groove in the interstage rim seal, but able to rotate into sealing position upon application of the centrifugal force produced by rotation of the turbine rotor assembly.

Example embodiments of the invention may minimize the amount of air diverted from the combustor for cooling by minimizing or preventing cooling air leakage through wheel spaces into the hot gas path. Example embodiments may also minimize or prevent hot gases leaking into the wheel spaces between the rotating components attached to the rotor.

According to example embodiments of the invention, various seal component configurations and materials, methods of attachment, mating surfaces, and/or retention groove configurations for sealing the interstage rim will now be described with reference to the accompanying figures.

Figure 1:
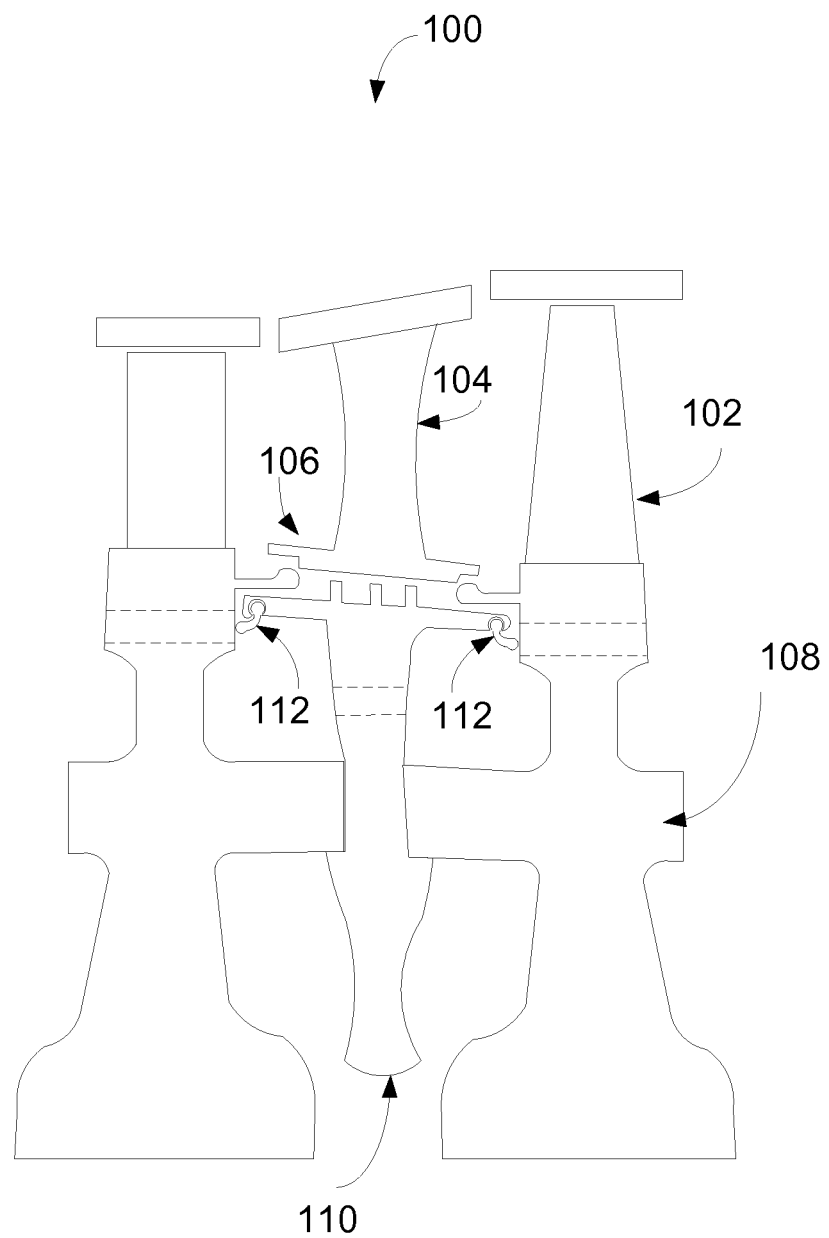
FIG. 1 is a diagram of an illustrative example turbine section, according to an example embodiment of the invention.

FIG. 1 illustrates an example turbine section 100, according to an example embodiment of the invention. For example, the turbine section 100 may include one or more buckets 102, one or more nozzles 104, a near flow path seal 106, one or more spacers 110, and one or more rotatable rim seal segments 112. According to an example embodiment of the invention, the rotatable rim seal segments 112 may provide a seal between the interstage rotor rim seal and the turbine wheel/buckets.

Figure 2:
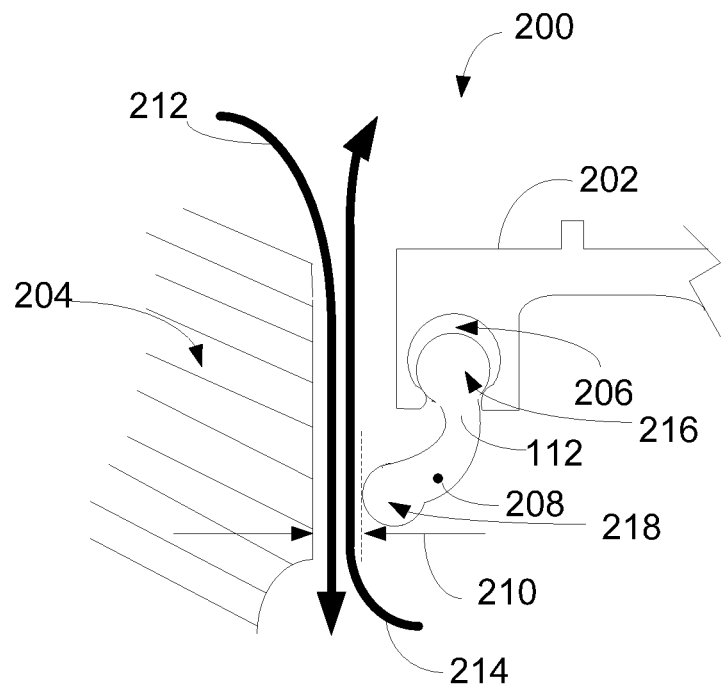
FIG. 2 is a diagram of an illustrative example rim seal in a resting or installation position, according to an example embodiment of the invention.

FIG. 2 illustrates an example rim seal (as in 112, FIG. 1) in a resting or first position 200 in accordance with an embodiment of the invention. According to an example embodiment, a near flow path seal 202 may be positioned adjacent to a turbine wheel or rotor 204. In an example embodiment, in a resting state and/or during installation of the various turbine components, the rim seal 112 may be retained from the rim seal first end 216 by a rim seal channel 206. According to an example embodiment, the rim seal 112 may include a center of gravity 208 that may be offset from the center of the rim seal channel 206 and towards the wall of the turbine wheel or rotor 204. According to an example embodiment, the rim seal 112 may, in a first or resting position 200, provide a gap 210 between the second end of the rim seal 218 and the turbine wheel or rotor 204. In an example embodiment, the gap 210 may provide clearance to allow components to be installed in the turbine assembly. If present, gases 212 214 may be free to pass through the gap 210 between the rotor cavity and the hot gas path. For example, in the resting position 200, hot gas 212 may enter the rotor cavity, and/or cooling gas 214 may enter the hot gas path.

Figure 3:
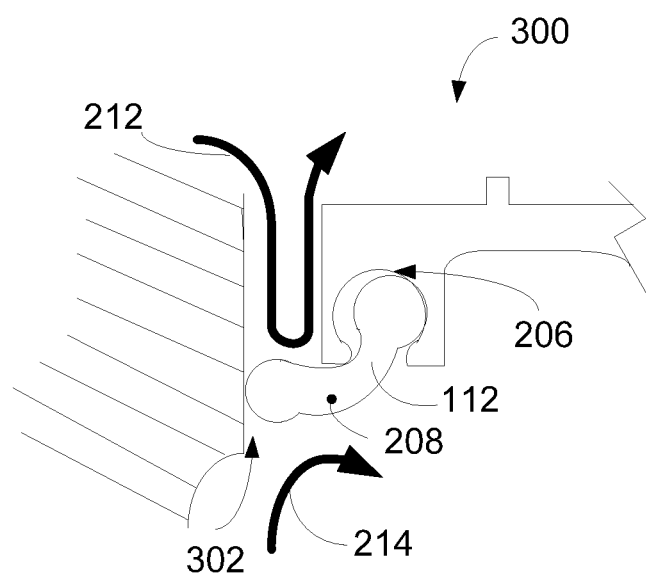
FIG. 3 is a diagram of an illustrative example rim seal in a rotated position to provide a seal, according to an example embodiment of the invention.

FIG. 3 illustrates an example rim seal in a rotated or sealing position 300 in accordance with an embodiment of the invention. As shown in this embodiment, when centrifugal force acts on the center of gravity 208 of the rim seal 112, the rim seal 112 may rotate, pivot, or translate into place so that the second end (as in 218, FIG. 2) closes off or otherwise narrows the gap (as in 210, FIG. 2) between the near flow path seal (as in 202, FIG. 2) and the turbine wheel or rotor (as in 204, FIG. 2). In an example embodiment, when the turbine is rotating, the second end (as in 218, FIG. 2) of the rim seal 112 may come in contact with or otherwise be substantially adjacent to the wall of the turbine wheel or rotor (as in 204, FIG. 2) and effectively provide a sealed gap 302 so that the flow of hot gas 212 may be restricted from entering the rotor cavity, and/or so that the flow of cooling gas 214 may be restricted from entering the hot gas path.

Figure 4:
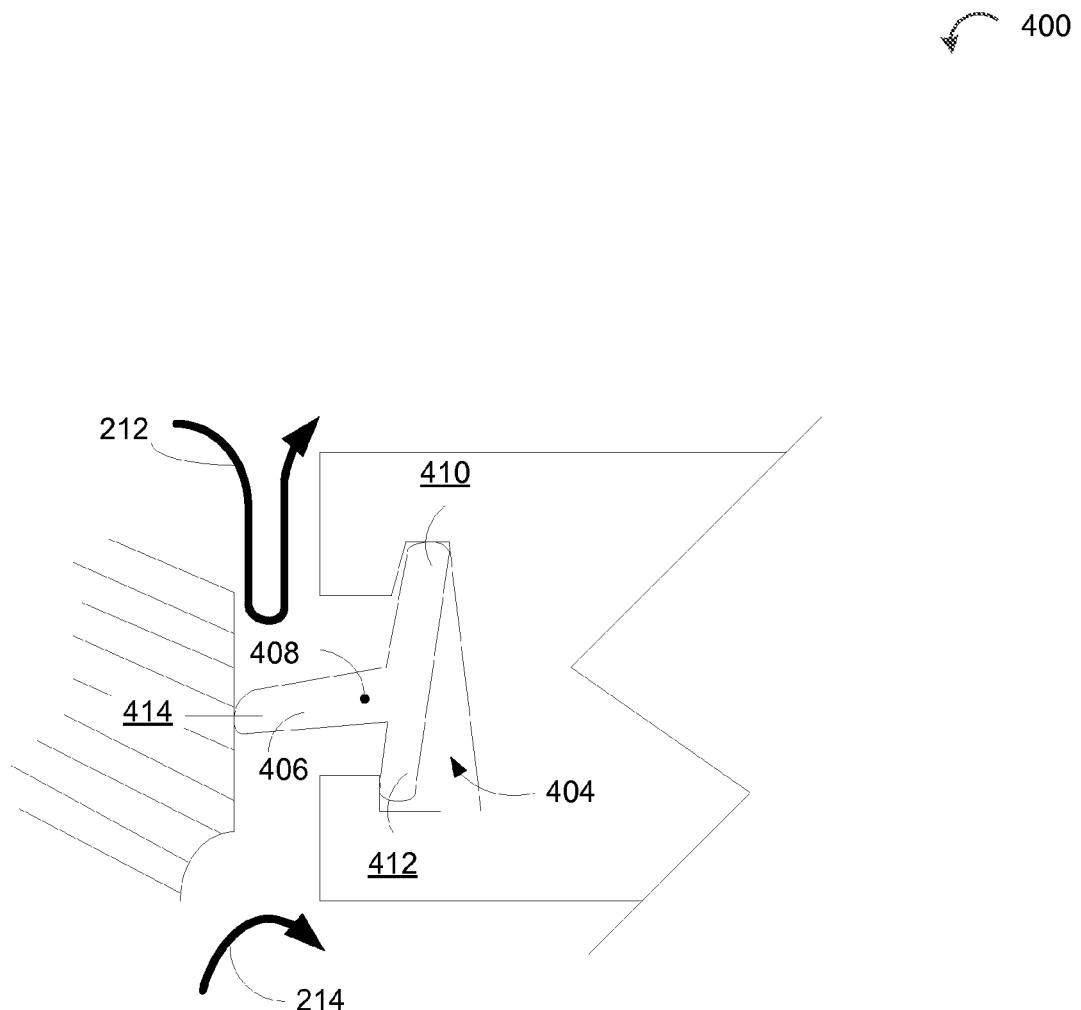
FIG. 4 is a diagram of another illustrative rim seal, according to an example embodiment of the invention.

FIG. 4 depicts another rim seal 400 configuration, according to an example embodiment of the invention. In an example embodiment, the rim seal channel 404 may be substantially rectangular in shape, rather than rounded (as depicted in 206 FIG. 2). According to example embodiments, the rim seal 406 may be configured such that it is retained in the rim seal channel 404, but upon rotation of the turbine, the centrifugal force may act upon the rim seal center of gravity 408 to pivot a first portion of the rim seal segment 410 within the rim seal channel 404 and translate a second portion of the rim seal segment 412 within the rim seal channel 404 to displace a third portion of the rim seal segment 414 to close and seal the gap between the near flow path seal and the turbine wheel or rotor 204.

According to example embodiments, the rim seal 112, 406 may be an integral part of the interstage rim seal system and may reduce maintenance time, and may remove the hazard of seal pieces falling into the gas turbine. Example embodiments of the invention may also enable relaxing the tolerances associated with controlling axial location of the interstage rim seal, for example, as compared with wire seals which typically require tight tolerances to prevent them from being liberated due to centrifugal force and wider than expected gap.

Figure 5:
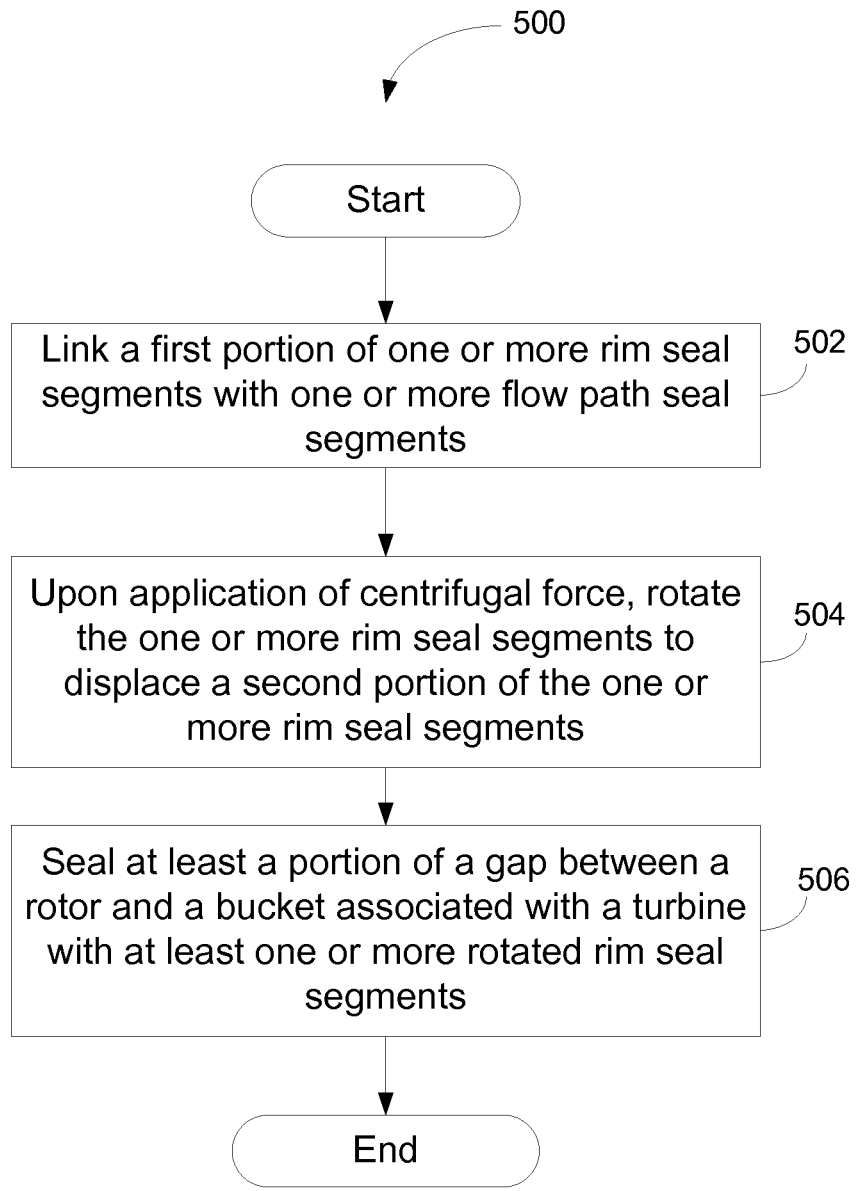
FIG. 5 is a diagram of an example method according to an example embodiment of the invention.

An example method 500 for sealing a turbine-rotor bucket interface in accordance with an embodiment of the invention will now be described with reference to the flowchart of FIG. 5. The method 500 starts in block 502, where according to an example embodiment, the method 500 includes linking a first portion of one or more rim seal segments with one or more flow path seal segments. In block 504, the method 500 includes rotating the one or more rim seal segments to displace a second portion of the one or more rim seal segments upon application of centrifugal force. In block 506, the method 500 includes sealing at least a portion of a gap between a rotor and a bucket associated with a turbine with at least one or more rotated rim seal segments. The method 500 ends after block 506.

In accordance with additional embodiments of the invention linking the first portion 216 of the one or more rim seal segments 112 with the one or more flow path seal segments 202 can include inserting the first portion 216 of the one or more rim seal segments into a rim seal channel 206 associated with the one or more flow path seal segments 202. In accordance with example embodiments of the invention, the method 500 can include constraining the one or more rim seal segments 112 to prevent axial translation of the one or more rim seal segments 112 within rim seal channels 206 while allowing radial rotation of the one or more rim seal segments 112.

Example embodiments of the invention can also include overlapping at least a portion of the one or more rim seal segments 112 to form a multi-segment seal between a turbine rotor 108 and bucket 102. According to an example embodiment, the first portion 206 of the one or more rim seal segments 112 may be constrained in at least two dimensions but may be operable to rotate and axially displace the second portion of the one or more rim seal segments 112 upon application of centrifugal force. In an example embodiment, the application of centrifugal force may act on a center of gravity 208 of the one or more rim seal segments 112 to rotate the one or more rim seal segments 218 and to displace a second portion 218 of the one or more rim seal segments 112 towards the rotor 204. According to an example embodiment, sealing at least a portion of the gap 302 between the rotor 108 and the bucket 102 with the at least one or more rotated rim seal segments 112 can include isolating a rotor cavity from hot gas path gases.

Example embodiments of the invention also include a system and/or an apparatus for sealing a turbine rotor-bucket interface. The system may include a rotor 108, at least one bucket 102, and one or more flow path seal 202 segments. Example embodiments of the system and/or the apparatus may include one or more rim seal segments 112 having a first portion 216 linked with the one or more flow path seal segments 202, wherein the one or more rim seal segments 112 are configured to rotate upon application of centrifugal force to displace a second portion 218 of the one or more rim seal segments 112 and seal at least a portion of a gap 302 between the one or more flow path seal 202 segments, the rotor 108, and the at least one bucket 102.

According to certain embodiments of the invention, the first portion 216 of the one or more rim seal segments may be inserted into a rim seal channel 206 associated with the one or more flow path seal segments 202 to link the one or more rim seal segments 112 with the one or more flow path seal segments 202. According to certain example embodiments of the invention, one or more rim seal segments 112 may be axially constrained to prevent axial translation of the one or more rim seal segments 112 within rim seal channels 206 while allowing radial rotation of the one or more rim seal segments 112. According to certain example embodiments of the invention, a portion of the one or more rim seal segments 112 may overlap one another to form a multi-segment seal between the rotor 108 and the at least one bucket 102. In an example embodiment, the first portion 206 of the one or more rim seal segments 112 may be constrained in at least two dimensions, but may be operable to rotate and axially displace the second portion of the one or more rim seal segments 112 upon application of centrifugal force, for example, when the turbine is rotating. In an example embodiment, the application of centrifugal force may act on a center of gravity 208 of the one or more rim seal segments 112 to rotate the one or more rim seal segments 218 and to displace a second portion 218 of the one or more rim seal segments 112 towards the rotor 204 or the turbine wheel.

According to an example embodiment, at least a portion of the gap 302 between the rotor or wheel 108 and the at least one bucket 102 may be sealed with the at least one or more rotated rim seal segments 112 to isolate the rotor cavity and associated rotor components from hot gas path gases.

According to example embodiments of the invention, a wire-wound or braided cable (wire rope) may be utilized in conjunction with the seal segments 112. In an example embodiment, the wire rope may be made from a nickel alloy capable of withstanding the high temperatures of the hot gases. According to an example embodiment, the wire rope may be embedded or otherwise retained or trapped adjacent to the second end of the rim seal 218. According to an example embodiment, the wire rope may provide contact with the rotor 204 and may (at least partially) provide sealing between the near flow path seal 202 and the turbine wheel or rotor 204. According to example embodiments, the wire rope may be more compliant that a solid seal, and may provide a more effective seal over an uneven surface. For example, in certain turbines, there may be some unevenness near the rotor disk post and bucket dovetail in the rim area for which the wire rope may provide enhanced sealing.

According to example embodiments of the invention, a wire brush seal may be utilized in conjunction with the seal segments 112. In an example embodiment, the wire brush may be capable of withstanding the high temperatures of the hot gases. According to an example embodiment, the wire brush may be embedded or otherwise retained or trapped adjacent to the second end of the rim seal 218. According to an example embodiment, the brush may provide contact with the rotor 204 and may (at least partially) provide sealing between the near flow path seal 202 and the turbine wheel or rotor 204. According to example embodiments, the brush may be more compliant that a solid seal, and may provide a more effective seal over an uneven surface. For example, in certain turbines, there may be some unevenness near the rotor disk post and bucket dovetail in the rim area for which the brush may provide enhanced sealing.

Accordingly, example embodiments of the invention can provide the technical effects of improving the sealing capability of interstage rim seals. Example embodiments of the invention can provide the further technical effects of better sealing capability with less likelihood of dropping seal pieces into turbine. Example embodiments of the invention can provide the further technical effects of effectively shielding and sealing the rim area of the turbine wheels, to minimize exposure of the turbine wheel to hot gases, and to minimize leakage of air that is used to cool the turbine blades or buckets.

As desired, embodiments of the invention may include the example turbine system 100, and/or the example rim seals 200, 300, 400 with more or less of the components illustrated in FIGS. 1 through 4.

While the invention has been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:

1. A method for sealing a turbine rotor-bucket interface, the method comprising:
    linking a first portion of one or more rim seal segments with one or more flow path seal segments;
    upon application of centrifugal force, pivoting a first portion of the one or more rim seal segments within a rim seal channel and translating a second portion of the one or more rim seal segments within the rim seal channel to displace a third portion of the one or more rim seal segments; and
    sealing at least a portion of a gap between a rotor and a bucket associated with a turbine with at least one or more rotated rim seal segments.

2. The method of claim 1, further comprising constraining the one or more rim seal segments within the rim seal channel while allowing radial rotation of the one or more rim seal segments.

3. The method of claim 1, further comprising abutting at least a portion of the one or more rim seal segments to form a multi-segment seal between a turbine rotor and bucket.

4. The method of claim 1, wherein the first portion of the one or more rim seal segments is constrained in at least two dimensions but is operable to rotate and axially displace the second portion of the one or more rim seal segments upon application of centrifugal force.

5. The method of claim 1, wherein the application of centrifugal force acts on a center of gravity of the one or more rim seal segments to rotate the one or more rim seal segments and to displace the second portion of the one or more rim seal segments towards the rotor.

6. The method of claim 1, wherein sealing at least a portion of the gap between the rotor and the bucket with the at least one or more rotated rim seal segments comprises isolating a rotor cavity from hot gas path gases.

7. A system for sealing a turbine rotor-bucket interface comprising:
 a rotor;
 at least one bucket;
 one or more flow path seal segments; and
 one or more rim seal segments within a rim seal channel having a first portion linked with the one or more flow path seal segments, wherein a first portion of the one or more rim seal segments within the rim seal channel are configured to pivot upon application of centrifugal force and a second portion of the one or more rim seal segments within the rim seal channel are configured to translate upon application of centrifugal force to displace a third portion of the one or more rim seal segments and seal at least a portion of a gap between the one or more flow path seal segments, the rotor, and the at least one bucket.

8. The system of claim 7, wherein the one or more rim seal segments are axially constrained within the rim seal channel while allowing radial rotation of the one or more rim seal segments.

9. The system of claim 7, wherein at least a portion of the one or more rim seal segments abut one another to form a multi-segment seal between the rotor and the at least one bucket.

10. The system of claim 7, wherein the first portion of the one or more rim seal segments is constrained in at least two dimensions but is operable to rotate and axially displace the second portion of the one or more rim seal segments upon application of centrifugal force.

11. The system of claim 7, wherein the application of centrifugal force acts on a center of gravity of the one or more rim seal segments to rotate the one or more rim seal segments and to displace the second portion of the one or more rim seal segments towards the rotor.

12. The system of claim 7, at least a portion of the gap between the rotor and the at least one bucket is sealed with the at least one or more rotated rim seal segments to isolate a rotor cavity from hot gas path gases.

13. An apparatus for sealing a turbine rotor-bucket interface comprising:
 one or more rim seal segments within a rim seal channel having a first portion linked with one or more flow path seal segments, wherein a first portion of the one or more rim seal segments within the rim seal channel are configured to pivot upon application of centrifugal force and a second portion of the one or more rim seal segments within the rim seal channel are configured to translate upon application of centrifugal force to displace a third portion of the one or more rim seal segments and seal at least a portion of a gap between the one or more flow path seal segments, a rotor, and at least one bucket.

14. The apparatus of claim 13, wherein the one or more rim seal segments are axially constrained within the rim seal channel while allowing radial rotation of the one or more rim seal segments.

15. The apparatus of claim 13, wherein at least a portion of the one or more rim seal segments abut one another to form a multi-segment seal between the rotor and the at least one bucket.

16. The apparatus of claim 13, wherein the first portion of the one or more rim seal segments is constrained in at least two dimensions but is operable to rotate and axially displace the second portion of the one or more rim seal segments upon application of centrifugal force.

17. The apparatus of claim 13, wherein the application of centrifugal force acts on a center of gravity of the one or more rim seal segments to rotate the one or more rim seal segments and to displace the second portion of the one or more rim seal segments towards the rotor and to isolate a rotor cavity from hot gas path gases.

\* \* \* \* \*